(12) United States Patent
Parulski et al.

(10) Patent No.: US 7,146,179 B2
(45) Date of Patent: Dec. 5, 2006

(54) PORTABLE IMAGING DEVICE EMPLOYING GEOGRAPHIC INFORMATION TO FACILITATE IMAGE ACCESS AND VIEWING

(76) Inventors: Kenneth A. Parulski, Eastman Kodak Company 343 State St., Rochester, NY (US) 14650; Pierre Schaeffer, Eastman Kodak Company 343 State St., Rochester, NY (US) 14650; Jay A. Endsley, Eastman Kodak Company 343 State St, Rochester, NY (US) 14650

( * ) Notice: Subject to any disclaimer, the term of this patent is extended or adjusted under 35 U.S.C. 154(b) by 86 days.

(21) Appl. No.: 10/279,458

(22) Filed: Oct. 24, 2002

(65) Prior Publication Data

US 2003/0186708 A1 Oct. 2, 2003

Related U.S. Application Data

(60) Provisional application No. 60/367,612, filed on Mar. 26, 2002.

(51) Int. Cl.
*H04Q 7/20* (2006.01)
(52) U.S. Cl. .................. 455/456.3; 455/566; 348/211.2
(58) Field of Classification Search ........... 348/207.99, 348/207.1, 207.2, 552, 211.99, 211.2, 211.8; 455/456.1, 456.3, 456.6, 457, 566, 414.1, 455/550.1, 556.1, 517, 404.2, 419, 412.1; 701/200, 213, 211, 218; 386/66
See application file for complete search history.

(56) References Cited

U.S. PATENT DOCUMENTS

| | | | |
|---|---|---|---|
| 5,475,441 A | 12/1995 | Parulski et al. .......... 348/552 |
| 5,491,507 A | 2/1996 | Umezawa et al. ......... 455/566 |
| 5,506,617 A | 4/1996 | Parulski et al. .......... 348/552 |
| 5,867,110 A | 2/1999 | Naito et al. |
| 5,959,577 A | 9/1999 | Fan et al. |
| 6,088,594 A | 7/2000 | Kingdon et al. |
| 6,091,956 A * | 7/2000 | Hollenberg .............. 455/456.1 |
| 6,327,533 B1 | 12/2001 | Chou |
| 6,606,117 B1 * | 8/2003 | Windle ....................... 348/239 |
| 6,697,731 B1 * | 2/2004 | Takayama et al. .......... 701/200 |
| 6,871,004 B1 * | 3/2005 | Bando ......................... 386/66 |
| 2001/0024236 A1 | 9/2001 | Sato et al. |
| 2004/0021780 A1 * | 2/2004 | Kogan ..................... 348/231.3 |

FOREIGN PATENT DOCUMENTS

WO  WO 01/69585 A1  2/2001

OTHER PUBLICATIONS

U.S. Appl. No. 09/576,288 entitled: Method for Providing Customized Photo Products over a Network, no date listed.
U.S. Appl. No. 09/574,985 entitled: System and Method for Providing Image Products and Services, no date listed.
U.S. Appl. No. 09/579,996 entitled: Producing a Compressed Digital Image Organized into Layers having Information Relating to Different Viewing Conditions and Resolutions, no date listed.

* cited by examiner

*Primary Examiner*—Eliseo Ramos-Feliciano
(74) *Attorney, Agent, or Firm*—Thomas J. Strouse

(57) ABSTRACT

A system and method for accessing and viewing images transmitted from a remote location to a portable imaging device, wherein each of the transmitted images having associated geographic information. The method comprises the steps of: providing the portable imaging device adapted to receive images transmitted from the remote location; determining a geographic location of the portable imaging device; and transmitting at least one image to the portable imaging device in an order dependent on the location of the portable imaging device.

21 Claims, 9 Drawing Sheets

PORTABLE IMAGING DEVICE EMPLOYING GEOGRAPHIC INFORMATION TO FACILITATE IMAGE ACCESS AND VIEWING

CROSS REFERENCES TO RELATED APPLICATIONS

This application claims priority of Provisional Application, U.S. Ser. No. 60/367,612 Filed Mar. 26, 2002.

FIELD OF THE INVENTION

The invention is directed to a wireless image display system. More specifically, the invention is directed to networked database of digital images accessed and viewed using a mobile cellular mobile telephone.

BACKGROUND

Video telephone equipment has been developed, for example, as described in U.S. Pat. No. 5,491,507 (Umezawa). Umezawa is directed to video telephone equipment configured as a mobile phone that includes a video camera and video display, a microphone and speaker.

SUMMARY OF THE INVENTION

The present invention provides a cellular telephone providing the capability to access and view high quality digital images from an Internet photo service provider. This enables user to "carry" all of their personal digital images with them at all times, by being able to access all of these images using their cellular telephone. The cell phone includes a wallet size, high quality, low-power color display, such as an OLED. The ability to quickly browse and zoom into images is provided using the JPEG 2000 image format and network client-server protocol. The cellular telephone optionally includes a camera head, having a compact lens and CMOS image sensor. The camera head is preferably included as part of an optional battery pack.

Accordingly, one object of the present invention is to provide a cellular telephone adapted to access and view high quality digital images from an Internet photo service provider.

Another object of the present invention is to provide such a telephone which is small in size, and include a high quality, low-power color display.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a system for accessing and viewing images transmitted from a remote location to a portable imaging device, wherein each of the transmitted images having associated geographic information. The system comprises the portable imaging device, and means for determining a geographic location of the portable imaging device, wherein the images transmitted to the portable imaging device are transmitted in an order dependent on the location of the portable imaging device. The portable imaging device comprises: a receiver adapted to receive images transmitted from the remote location; a memory for storing at least one of the images received from receiver; a display for displaying the images stored in the memory; user controls for selecting the image to be displayed on the display; and means for determining a geographic location of the portable imaging device.

According to another aspect of the invention, there is provided a method for accessing and viewing images transmitted from a remote location to a portable imaging device, wherein each of the transmitted images having associated geographic information. The method comprises the steps of: providing the portable imaging device adapted to receive images transmitted from the remote location; determining a geographic location of the portable imaging device; and transmitting at least one image to the portable imaging device in an order dependent on the location of the portable imaging device.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE PREFERRED EMBODIMENTS

Figure 1:
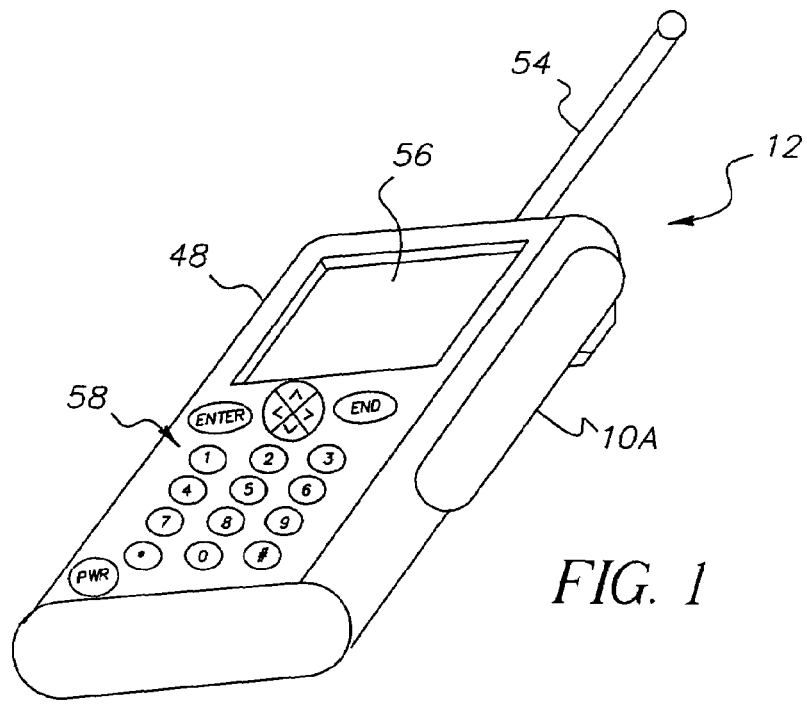
FIG. 1 depicts a photo phone in accordance with the present invention which provides enhanced photo access and viewing, and includes a detachable camera/battery module.

The following is a detailed description of the preferred embodiments of the invention, reference being made to the drawings in which the same reference numerals identify the same elements of structure in each of the several figures.

Figures 2, 3:
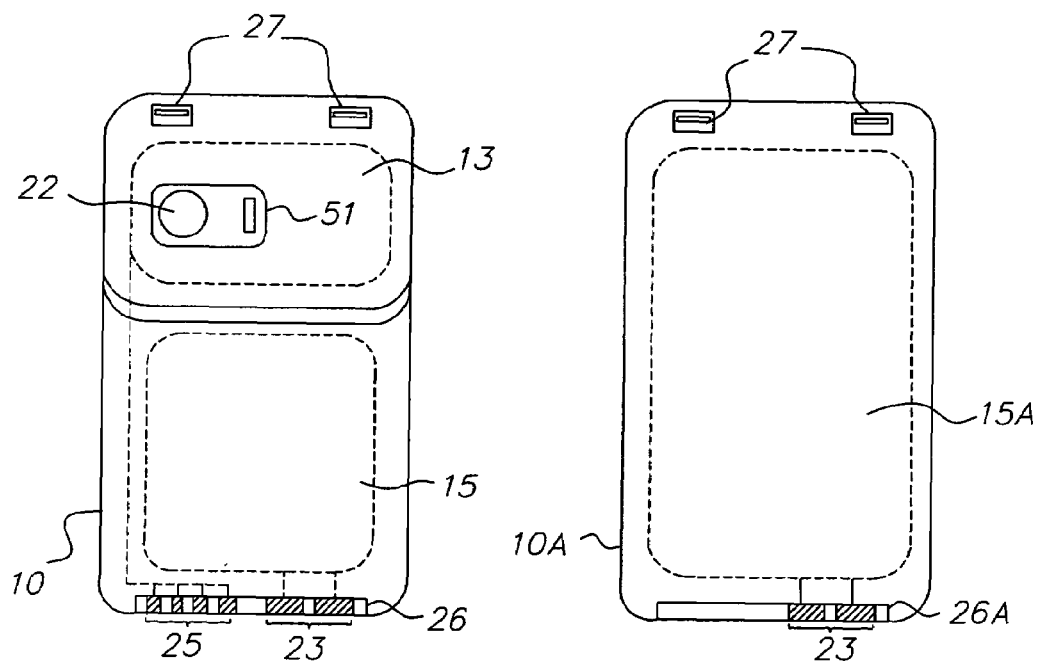
FIG. 2 depicts the camera/battery module.
FIG. 3 depicts an alternative battery module.

Referring to FIGS. 1–3, FIG. 1 generally illustrates a mobile photo viewing device in accordance with the present invention. A mobile (e.g. portable; cellular) phone 48 mates with a battery module 10A (more particularly described below with reference to FIG. 3) to provide a combination cellular telephone and photo display device, hereinafter referred to as a photo phone 12. Photo phone 12 is adapted to enable a user to view digital images stored by a service provider and to view images stored on a user's computer, as will be more particularly described below with reference to FIG. 6.

Photo phone 12 also enables a user to order prints and other photo/image related products using these digital images. Photo phone 12 also enables the user to easily access images that are likely to be of particular interest to a user, according to the present geographic location of the user.

In addition, mobile phone 48 also mates with a combined camera battery module 10 to form a photo phone/camera, capable of capturing, transmitting, receiving, and displaying the received digital images. Camera/battery module 10, best shown in FIG. 2, includes a lens 22, and a sliding lens cover 51. At least one mounting clip 27 is provided to aid in securing camera/battery module 10 to mobile phone 48. Camera/battery module 10 also includes camera electronics 13, a rechargeable battery 15, and electrical contacts 26 which include power contacts 23 that provide power to mobile phone 48 and signal contacts 25, as will be described below with reference to FIG. 5.

Referring now to FIG. 3, standard battery module 10A includes a smaller (e.g. slimmer; thinner) rechargeable battery 15A and electrical contacts 26A that includes power contacts 23 but does not include signal contacts. Standard battery module 10A includes at least one mounting clip 27, but does not include lens 22 or camera electronics 13. Battery module 10A enables mobile phone 48 to operate, receive, and display the received digital images, and to operate as a normal voice-only cell phone, which is thinner and lighter than when the combined camera/battery module 10 is used.

Figure 4:
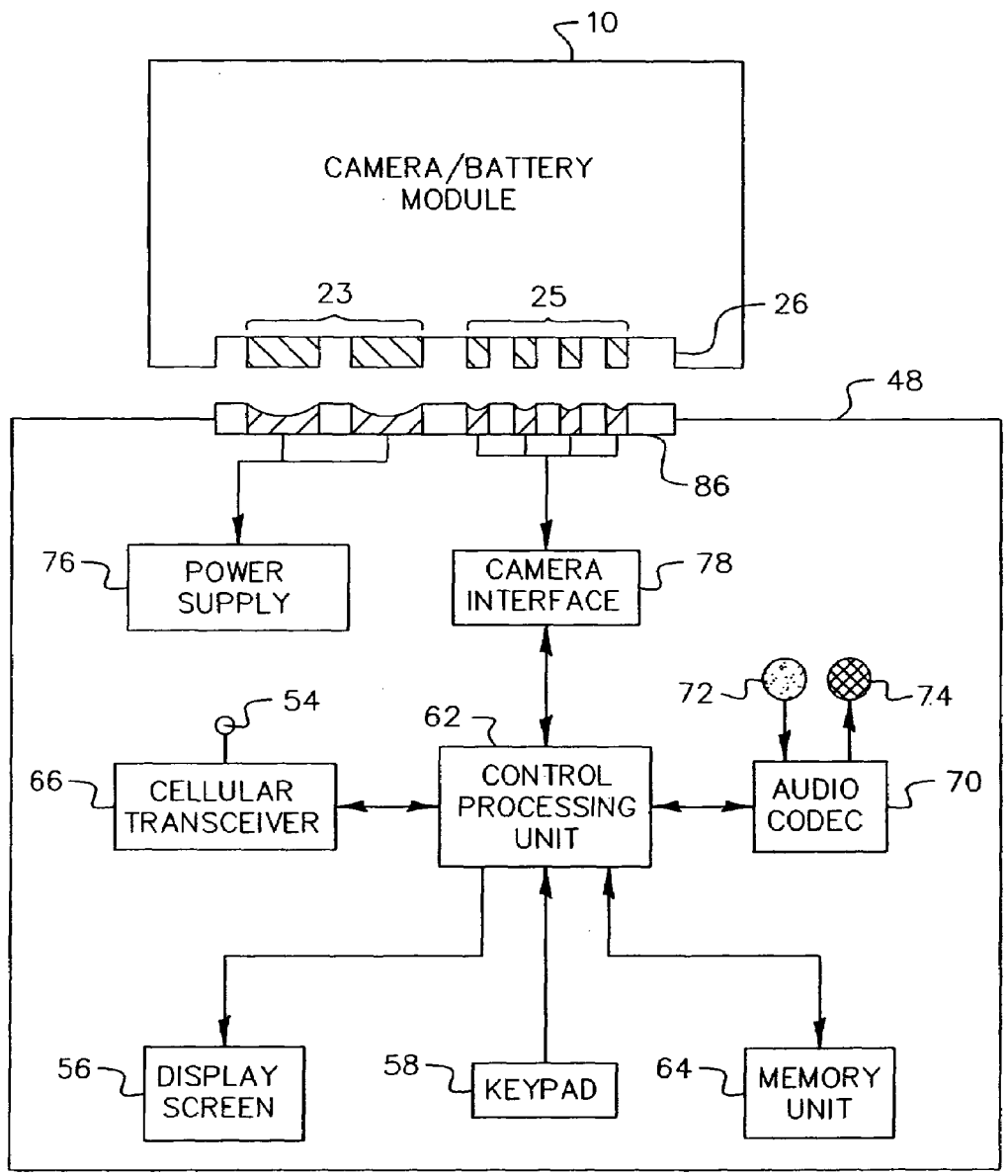
FIG. 4 is a schematic block diagram of the mobile telephone unit of FIG. 1.

As shown in FIG. 1, mobile phone 48 includes an antenna 54 and a front face including a display screen 56 and a user control/interface 58, and can also include a microphone 72 and speaker 74 (shown in FIG. 4). Display screen 56 is preferably a color liquid crystal display (LCD) or an organic light emitting diode (OLED) display having, for example, 256×256 display pixels. User interface 58 can include a keypad, 4-way controller, buttons, and the like. Mobile phone 48 can optionally include a connector for an external hands-free microphone/earpiece (not shown) and a battery charger (not shown).

As shown in FIG. 4, display screen 56 and user interface 58 (referenced in FIG. 4 as a keypad) are coupled to a control processing unit 62, which can be, for example, a microprocessor. Control processing unit 62 is also coupled to a memory unit 64, which includes dynamic RAM (DRAM) memory volatile memory, or Flash EPROM non-volatile memory, or both. Control processing unit 62 is further coupled to a cellular transceiver 66 which connects to antenna 54 to provide a radio frequency (RF) transmitter/receiver. Control processing unit 62 is yet further connected to an audio codec 70 which connects to microphone 72 and speaker 74. Audio codec 70 provides signal amplification and A/D conversion of the signal from microphone 72. Audio codec 70 also includes a D/A converter and audio amplifier to drive speaker 74.

Control processing unit 62 is also connected to a camera interface 78. Camera interface 78 provides a signal interface to control camera/battery module 10 and to receive digital image signals from camera/battery module 10. The signals from camera interface 78 are connected to the signal contacts of a connector 86.

Mobile phone 48 further includes a power supply 76.

When camera/battery module 10 is connected to mobile phone 48, electrical contacts 26 mate with the corresponding contacts of connector 86. As a result, the signals from camera interface 78 are connected to signal contacts 25 of camera/battery module 10, and power contacts 23 from camera/battery module 10 are connected to power supply 76 in order to provide the required power to the circuits in mobile phone 48.

Camera interface 78 is preferably a UART that provides an RS-232 interface, although other types of standard and non-standard interfaces can be used. Although depicted as a separate block in FIG. 4, camera interface 78 can alternatively be provided as part of a microprocessor that serves as control processing unit 62. Such an integrated microprocessor could also include audio codec 70 and memory unit 64.

Figure 5:
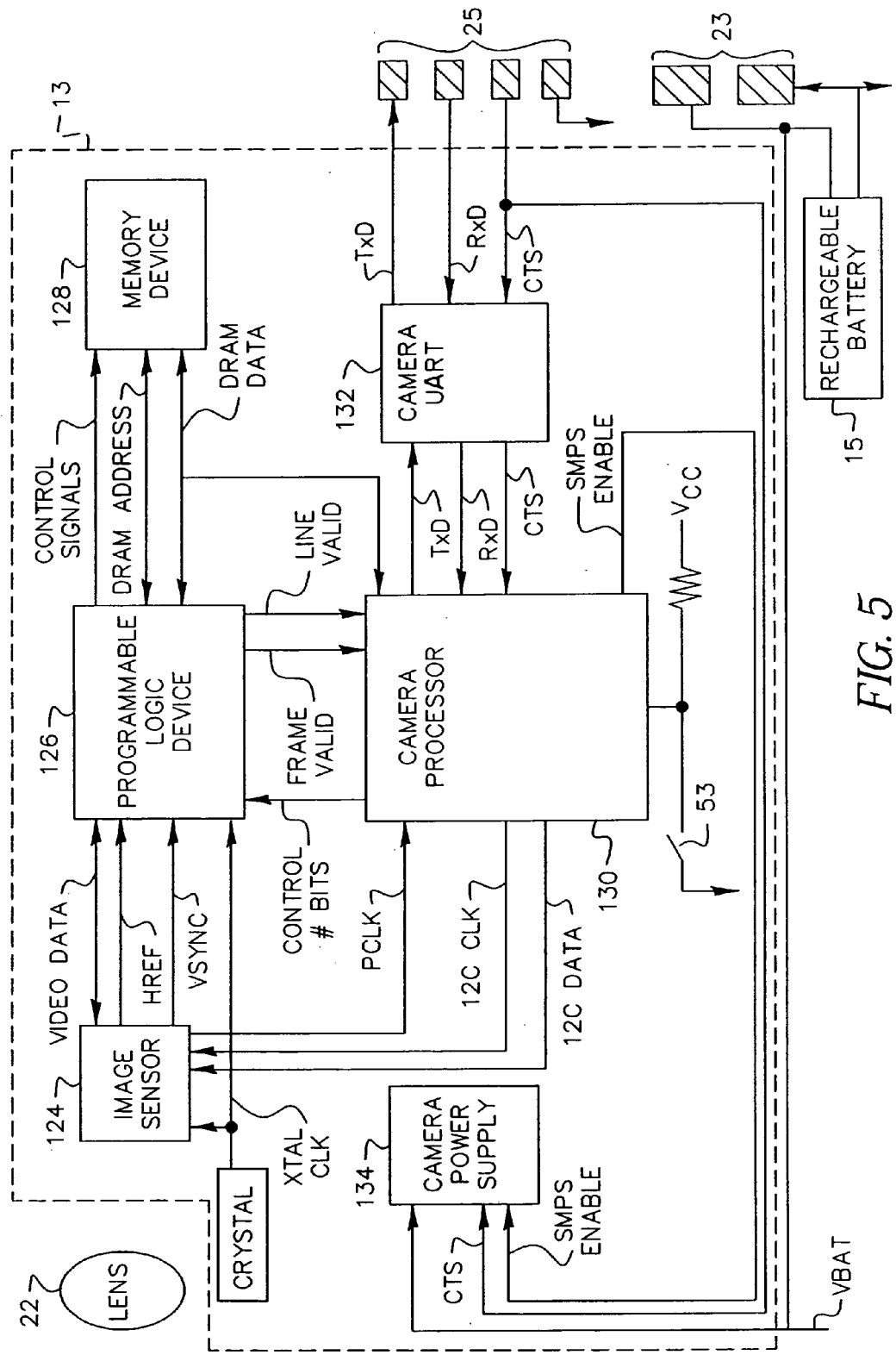
FIG. 5 is a schematic block diagram of the components of the camera/battery module.

A detailed schematic block diagram of one embodiment of camera battery module 10 in accordance with the present invention is illustrated in FIG. 5. As shown in FIG. 5, camera/battery module 10 includes lens 22 that focuses light onto a image sensor 124 such as a CMOS image sensor. Image sensor 124 can be, for example, a VGA format sensor having 640 columns and 480 rows of active photosites, overlayed with the well-known Bayer color filter array pattern. Digital image data generated by CMOS image sensor 124 is supplied to a programmable logic device 126 that controls the management and storage of the image data in a memory device 128 in response to control signals supplied by a camera processor 130. Camera processor 130 is coupled to a UART 132, which in turn is coupled to signal contacts 25 of electrical contacts 26. Programmable logic device 126 also receives a signal from a switch 53, which is activated when lens cover 51 is in an open position.

Alternatively, the camera portion of camera/battery module 10 can be of a form described in commonly assigned U.S. Pat. No. 5,475,441 entitled "Electronic Camera with Memory Card Interface to a Computer" incorporated herein by reference, which describes a removable camera module that fits into and interfaces with a standard PCMCIA card interface slot of a pen-based computer, or of a type described in commonly assigned U.S. Pat. No. 5,506,617 entitled "ELECTRONIC CAMERA INCORPORATING A COMPUTER-COMPATIBLE BUS INTERFACE", incorporated herein by reference, which describes a removable camera module that interfaces directly to a standard personal computer compatible bus.

Power for both camera electronics 13 and mobile phone 48 is provided by rechargeable battery 15. Power supply 76 in mobile phone 48 includes a battery voltage sensing circuit to determine the amount of charge remaining in rechargeable battery 15. A camera power supply 134 in camera/battery module 10 supplies power to camera electronics 13. Power is supplied to camera electronics 13 only when the user wants to take a picture and rechargeable battery 15 has sufficient charge to complete a picture taking and transmission operation.

Figure 6:
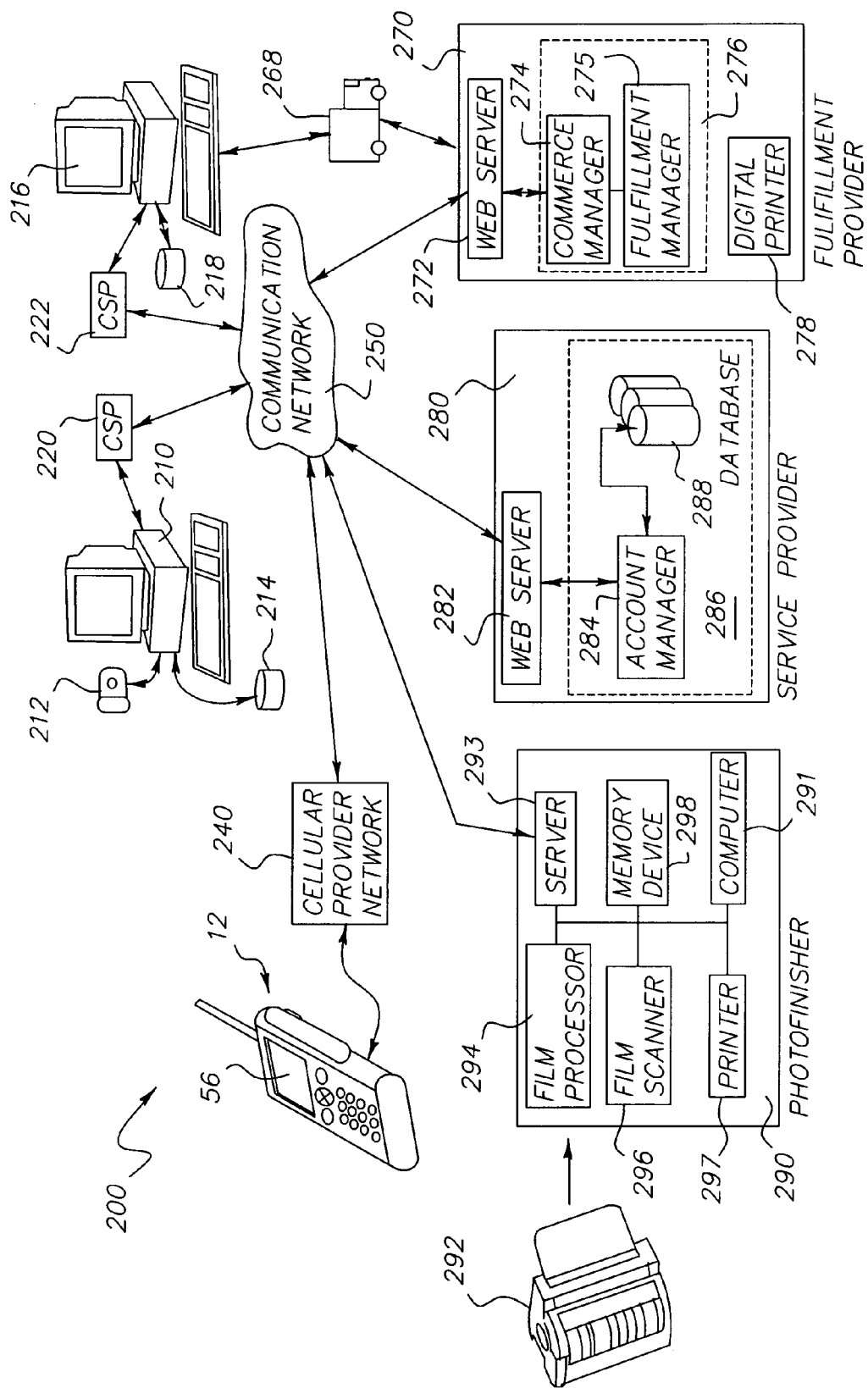
FIG. 6 is a block diagram of a system for providing images over a cellular telephone network to the photo phone in accordance with the present invention.

Turning now to FIG. 6, there is illustrated a system 200 in accordance with the present invention. Photo phone 12 communicates with a provider of a cellular provider network 240, as will be more particularly described below with reference to FIG. 7.

System 200 includes a customer computer 210 operably connected through a communication service provider (CSP) 220 and a communication network 250 (such as the Internet) to a photo service provider 280. Also included in system 200 is a third party computer 216 operably connected a storage drive 218 and to communication network 250 and service provider 280 via a communication service provider (CSP) 222. Customer computer 210 is also operably connected to a conventional electronic camera 212 and a storage drive 214. Electronic camera 12 can be a digital still camera such as the Kodak DX3600 digital camera manufactured by Eastman Kodak Company. For the simplification of discussion, digital images originally created by either electronic cameras, or by scanning film will be referred to as high resolution image files.

In a preferred embodiment, these high resolution image files are stored using the JPEG 2000 image format, and are organized into files as described in commonly assigned U.S. patent application Ser. No. 09/579,996, entitled "PRODUCING A COMPRESSED DIGITAL IMAGE ORGANIZED INTO LAYERS HAVING INFORMATION RELATING TO DIFFERENT VIEWING CONDITIONS AND RESOLUTIONS" by Joshi, et. al, the disclosure of which is incorporated herein by reference.

In the particular embodiment illustrated in FIG. 6, storage drives 214 and 218 are illustrated as being removable. However, the present invention is not limited to such a configuration. For example, storage drives 214 and 218 can be an integral part of computers 210 and 216, and can employ removable storage media (not shown). Electronic camera 212 can connect to customer computer 210 via a cable employing a common interface such as an Universal Serial Bus (USB) interface. Alternatively, electronic camera 212 can connect to customer computer 210 in a wireless mode employing any number of conventional interfaces such as the radio frequency standard commonly described by Bluetooth™ Specification V1.0 or Wireless Personal Area Network IEEE Standard 802.11.

Likewise, storage drive 214 is operably connected to customer computer 210 and permits the storage of high-resolution image files such as digital still images and associated metadata that can include location information. This location information metadata can be manually entered by a user of customer computer 210, or can be automatically included by incorporating a global positioning system (GPS) receiver in electronic camera 212. In general, high resolution images can be arranged in a customer storage file such as a database, which can include an index providing the GPS co-ordinates and file names of images stored on storage drive 214.

Customer computer 210 is provided with appropriate software for allowing controlled access to the high-resolution image collection, stored on storage device 214, over communication network 250.

Service provider 280 includes a web server 282 for interfacing with communications network 250, such as the Internet or a virtual private network (VPN). In addition to interfacing to communications network 250, web server 282 transfers information to a computer system 286 which manages images and information associated with various customers. Computer system 286 includes an account manager 284 which runs software to permit the creation and management of individual customer photo imaging accounts. Images and information associated with customer accounts is stored in a database(s) 288. Customer account information can include personal information such as name and address, billing information such as credit card information, and authorization information which controls access to the customer's images by third parties.

Database 288 also stores customer image files and related metadata, such as location information which identifies the location at which the image was captured or scanned.

System 200 also includes a photofinisher 290 for processing of photographic film 292. It should be noted that photofinisher 290 can be a retail establishment by itself or operating in association with a wholesale photofinishing establishment. In the particular embodiment illustrated, photofinisher 290 includes a film processor 294 for developing of the images on photographic film 292. A film scanner 296 is provided for scanning of images formed on the processed film for obtaining high resolution digital image files that are forwarded to a memory device 298 as high resolution image files. The photofinisher 290 also includes a server 293 for connecting to communications network 250, such as the Internet, and an appropriate computer 291 for managing the various equipment and various operations of the photofinishing system.

One such operation is the attachment of metadata to the high resolution image file that identifies the geographic location from which photographic film 292 was received. In the case wherein photofinisher 290 is a wholesale photofinisher operating in association with a retailer, a location identifier is attached as metadata to the high resolution image files which provides the location (e.g. the latitude and longitude) of the retailer. In the case wherein photofinisher 290 receives film for developing via mail, the location identifier can be based on the ZIP code of the user.

Photofinisher 290 also includes an appropriate printer 297 for printing of images onto an appropriate media, for example, photographic paper, thermal media, etc. It is, of course, understood that any other appropriate output device can be provided for producing prints or other products incorporating images that have been obtained from the scanning/developing of photographic film 292.

Also shown in FIG. 6 is a fulfillment provider 270, which provides image-based goods and/or services to customers and third parties. Fulfillment provider 270 includes a fulfillment web server 272, a digital printer 278, and a fulfillment computer system 276 that further includes a commerce manager 274 and a fulfillment manager 275. Fulfillment requests received from cellular provider 240, photo service provider 280, or computers 210 or 216 are handled by commerce manager 274 initially before handing the requests off to fulfillment manager 275. Fulfillment manager 275 determines which equipment is used to fulfill the ordered good(s) and/or services such as a digital printer 278. After fulfillment, the ordered goods/services are returned to the ordering party by a delivery means, for example, but not by way of limitation, a transportation vehicle 268.

Figure 7:
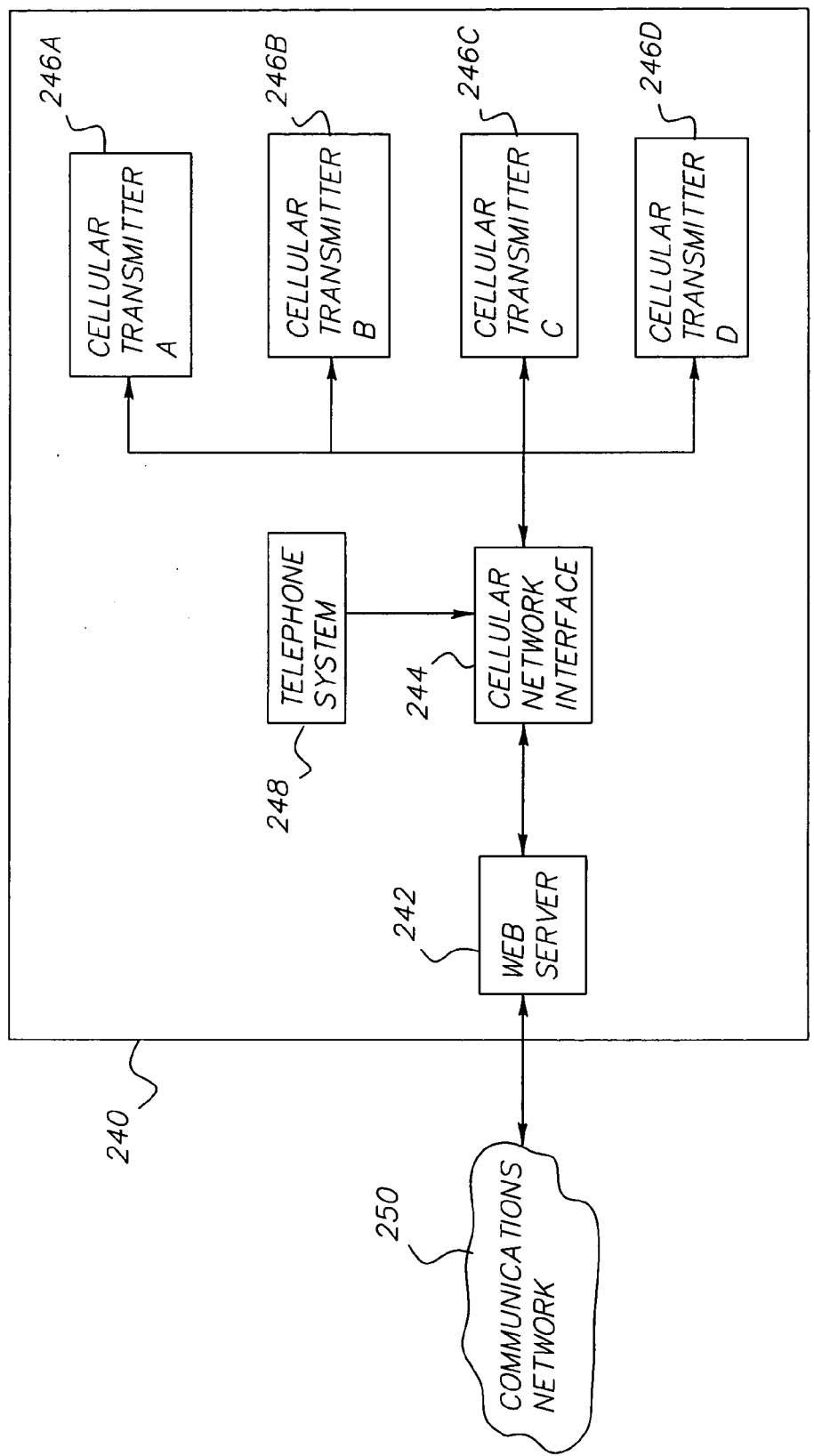
FIG. 7 is a diagram of a cellular telephone network which communicates with the photo phone and provides location information.

FIG. 7 shows a diagram of cellular provider network 240 which communicates with communications network 250 and a plurality of photo phones 12, and provides location information. A web server 242 in the cellular provider network 240 interfaces to communications network 250. Web server 242 also interfaces to a cellular network interface 244 which in turn connects to a large number of cellular transmitters, illustrated in FIG. 7 as 246A–246D. Cellular transmitters 246 are preferably located throughout a large geographical area served by cellular provider network 240. Cellular network interface 244 also connects to a wired telephone system 248 to communicate with wired telephones in order to provide normal telephone communications.

Each cellular transmitter 246 includes a communications tower located at a specific geographical location. Each photo phone 12 communicates with one specific cellular transmitter 246 at any particular time. The approximate geographical location of the user is determined by cellular network interface 244 by knowing which cellular transmitter 246 is currently communicating with a particular photo phone 12.

The inventors of the present invention have recognized that pictures taken at different geographic locations (e.g., a home location, a work location in the same city, a relative's house located in another city, etc.) are often most relevant to a user when the user is located in that same location. Therefore, if a collection of the user's stored digital images includes metadata that identifies the approximate geographical location where the picture was taken, and if the approximate geographic location of the user is known, then it is useful to present images to the user in a manner that provides a higher priority to images captured in geographical locations near the user's current geographical location. The higher priority can be provided by showing the "nearby" images first, when the user browses the collection of stored digital images.

Figure 8A:
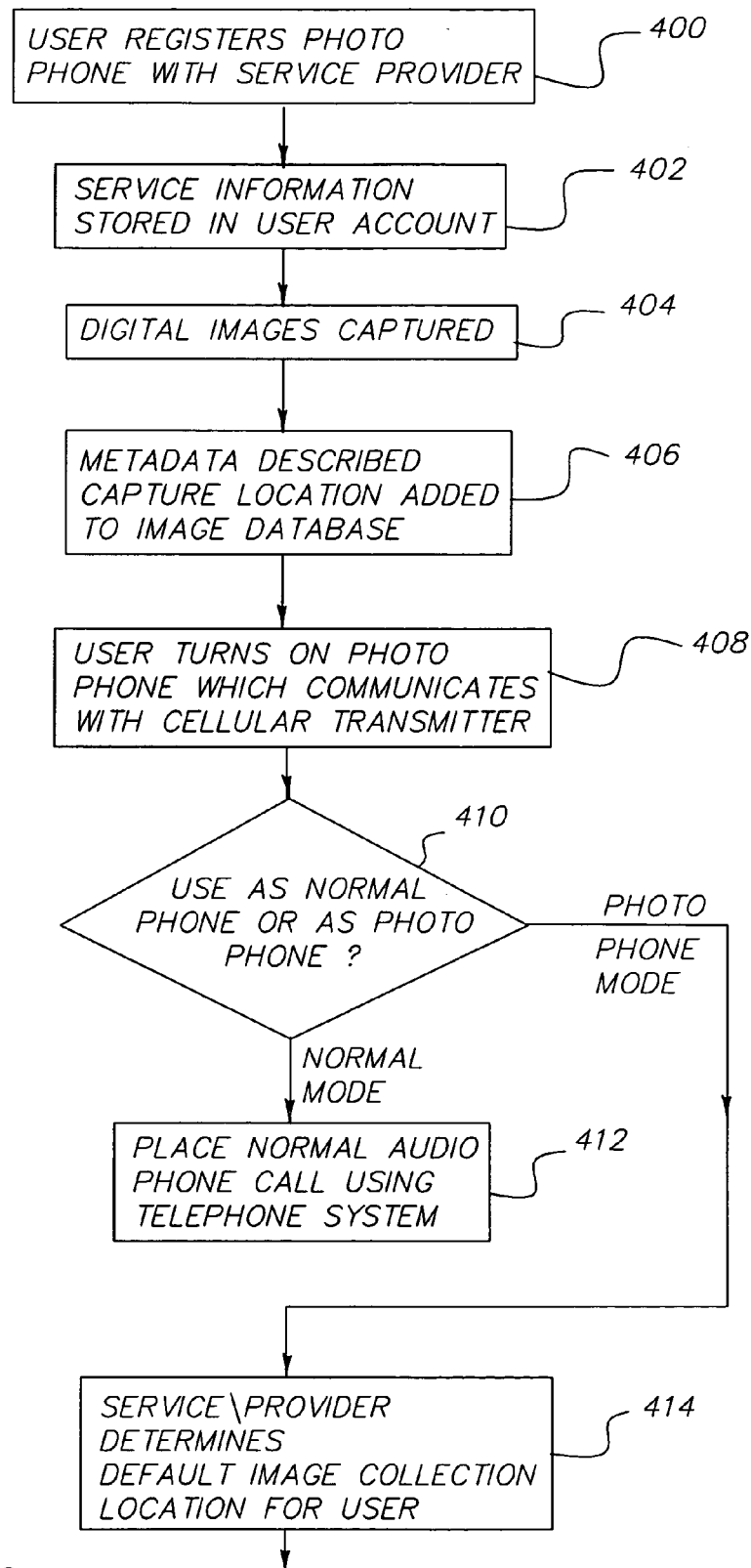
FIGS. 8A–8B is an operational flow diagram illustrating the operation of the system of FIG. 6.
Figure 8B:
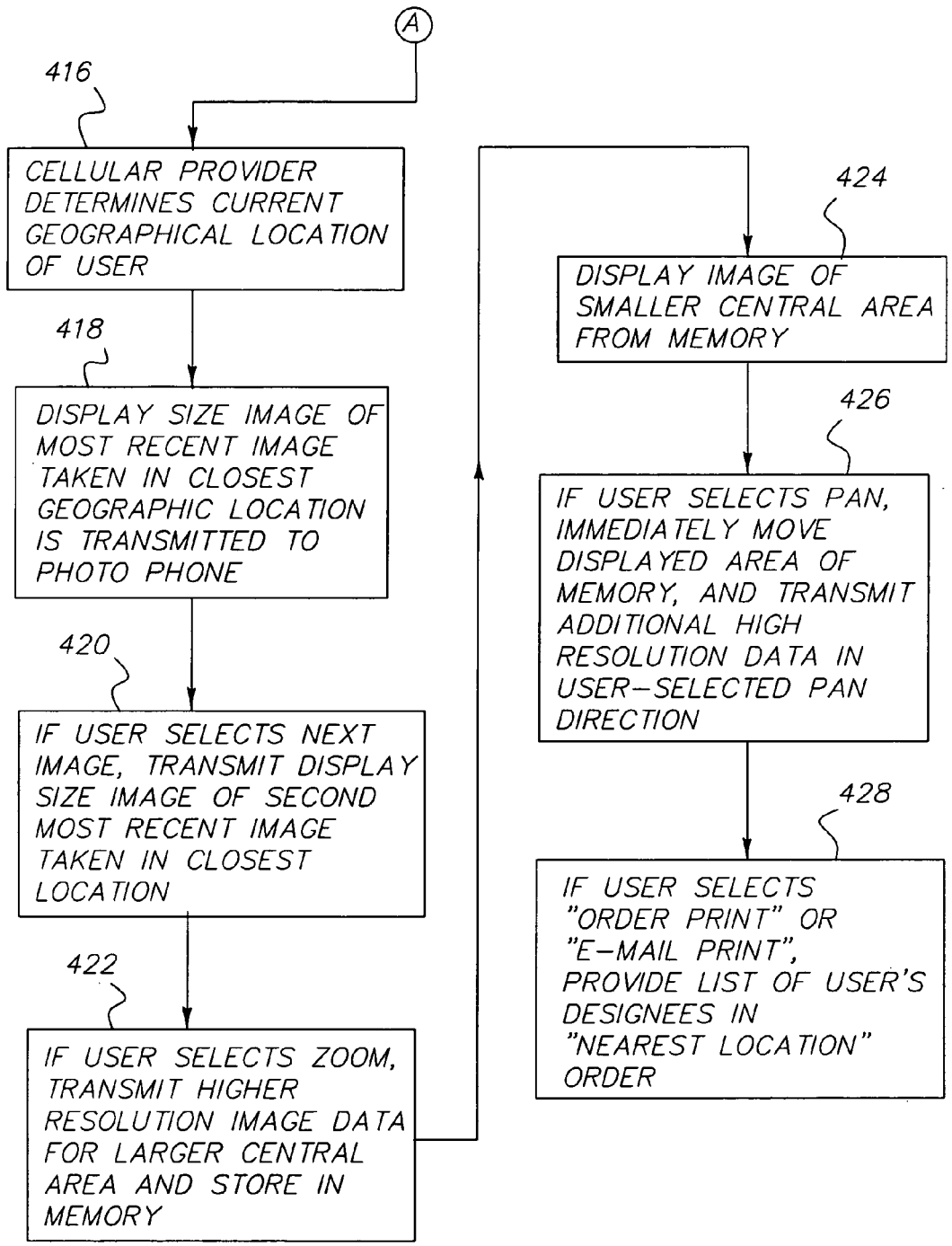

FIGS. 8A–8B show an operational flow diagram illustrating the operation of the system of FIG. 6. In block 400, the user purchases (or leases) photo phone 12 and registers photo phone 12 with photo service provider 280.

In block 402, the user provides service information, such as credit card information, mailing and e-mail addresses of family and friends, and an optional PIN number. This can be done when photo phone 12 is purchased or rented from the service provider, as described in commonly-assigned U.S. patent application Ser. No. 09/574,985 entitled "SYSTEM AND METHOD FOR PROVIDING IMAGE PRODUCTS AND SERVICES" to Wolcott, et. al., the disclosure of which is herein incorporated by reference. This enables photo phone 12 to automatically connect to cellular provider network 240 in order to access images and other information. In addition, customer fulfillment preferences can be stored using a service account information file as described in commonly-assigned U.S. patent application Ser. No. 09/576,288 entitled "METHOD FOR PROVIDING CUSTOMIZED PHOTO PRODUCTS OVER A NETWORK" to Parulski, the disclosure of which is herein incorporated by reference. This service account information file can be created when the user purchases or rents an electronic camera and/or in response to user selections of preferred photo products, such as service prints, album pages and the like, that the user purchases, for example, using fulfillment provider 270.

In block 404, a digital image is captured. This can be accomplished using several methods, for example, using electronic camera 212, using photographic film 292 in a film camera which is then developed and scanned by photofinisher 290, or by using camera/battery module 10 to capture images using photo phone 12 which are then transmitted to photo service provider 280 and stored in database 288.

In block 406, metadata describing the capture location is added to the image database. As described earlier, this may be done automatically by using a GPS receiver in electronic camera 212, or by photofinisher 290, or by identifying the approximate location of the cellular transmitter 246 used to transfer an image captured by photo phone 12 using camera/battery module 10.

In block 408, the user turns on photo phone 12.

In block 410, the user decides whether to use the photo phone 12 in normal voice mode or in photo phone mode.

If normal voice mode is selected (block 412), photo phone 12 connects to telephone system 248 and uses audio codec 70, microphone 72, and speaker 74 to provide normal cellular telephone service.

If photo mode is selected, at block 414, photo phone 12 communicates with photo service provider 280 (via cellular provider network 240) to determine the default image collection location for the user. This default image collection may be database 288 at the service provider, memory device 298 at photofinisher 290, or one of storage drives 214 or 218.

In block 416, cellular provider network 240 determines the current geographical location of the user by determining the particular cellular transmitter 246 (e.g., cellular transmitter 246A) which is communicating with photo phone 12.

In block 418, image data providing a display size image is transmitted from the default image collection location to photo phone 12. In a preferred embodiment, this data is stored as a JPEG 2000 image format file, and only the appropriate resolution and bit depth components are transmitted, to minimize the size of the transmitted image data. The first image transmitted is the most recent image taken in the closest geographic location, relative to the current geographic location of photo phone 12. Therefore, the particular image which is first transmitted will vary, depending on where the user is located.

In block 420, if the user selects to view the next image, a next (e.g., second) image is transmitted from the default image collection location to photo phone 12. The second image transmitted is the second most recent image taken in the closest geographic location, relative to the current geographic location of photo phone 12.

In block 422, if the user selects the zoom function, the higher resolution JPEG 2000 image data components for a "larger" central area of the image are transmitted to photo phone 12, and a smaller central area of this transmitted data is displayed in block 424, as will be more particularly described below with reference to FIGS. 10A–10C.

In block 426, if the user selects to pan (i.e., move/translate) the zoomed image, the display is immediately updated to progressively pan the image (as long as the pan button is held down), as will also be described below in reference to FIGS. 10A–10C.

In block 428, if the user selects to order a print, or share a print via e-mail, a list of possible recipients (e.g., friends and family) is displayed on display screen 56. The order of display is based on the default geographic location of these friends and family, provided by the information (e.g., their ZIP code) stored in the user account in block 402.

Figure 9:
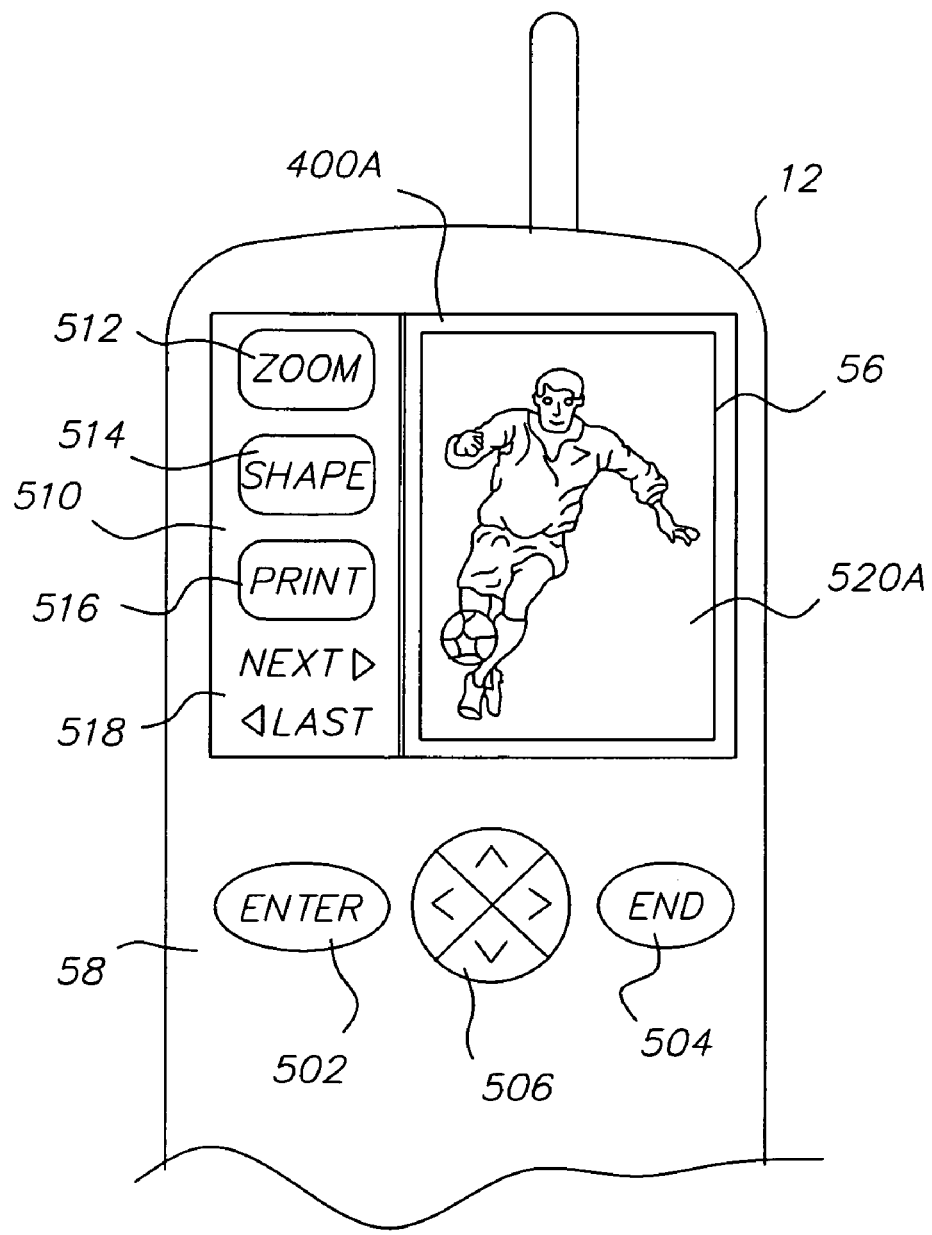
FIG. 9 depicts a user interface for the photo phone in accordance with the present invention.

FIG. 9 depicts an example of a user interface of photo phone 12. This user interface is displayed when the user selects the photo phone mode at block 410. The user interface can be displayed on display screen 56, and includes an image display window 520, which displays a particular image 520A, and a control window 510. Control window 510 includes a plurality of control icons, including a zoom icon 512, a share (e.g. e-mail) icon 514, and a print icon 516. User controls 58, which includes a enter key 502, an end key 504, and a 4-way control 506 can be used to select a control icon using the up/down arrow keys on 4-way control 506, followed by enter key 502. The photo mode can be exited, for example, using end key 504. The particular image displayed in image display window 520 can be controlled by pressing the left/right arrow keys of 4-way controller 506 and/or by selecting next/last icon 518.

It should be noted that the control window 510 is located to the left of image display window 520 since a portrait-oriented image is being displayed. When a landscape-oriented image is displayed in image display window 520, control window 510 can be located at the bottom of display screen 56, and can be located below image display window 520.

Figure 10A:
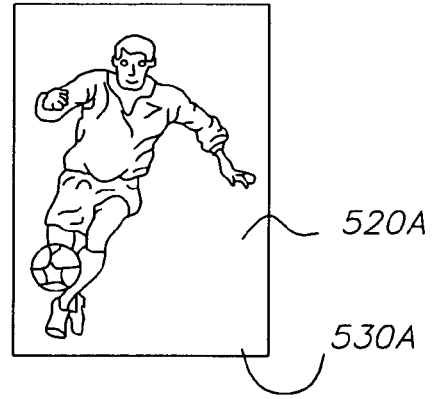
FIGS. 10A–10C depict the process of zooming a digital image displayed on the photo phone in accordance with the present invention.
Figure 10B:
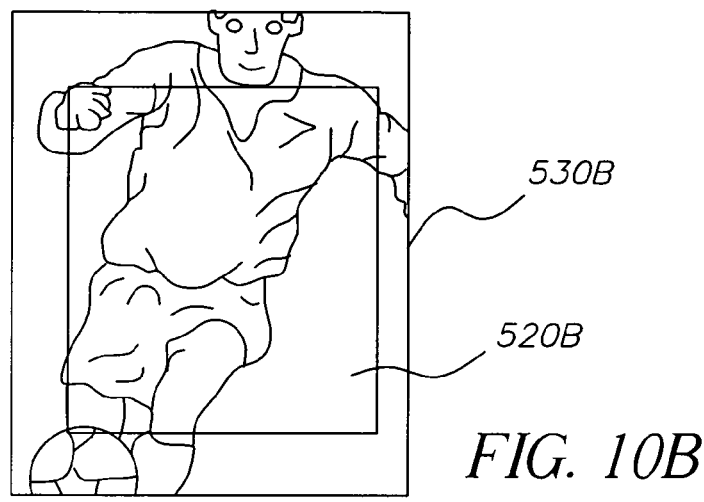
Figure 10C:
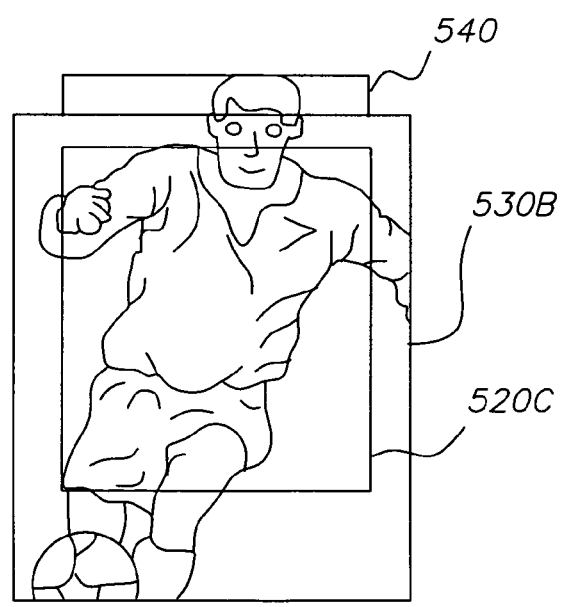

FIGS. 10A–10C depict the process of zooming a digital image displayed on photo phone 12. FIG. 10A shows an image data 530A transmitted to photo phone 12, which corresponds exactly to image 520A displayed in image display window 520 of display screen 56.

When the user selects zoom icon 512 and presses enter key 502, photo phone 12 requests the higher resolution data for a larger central image data area 530B, which is then transmitted to photo phone 12, and stored in memory unit 64, as shown in FIG. 10B. Accordingly, a slightly smaller central portion 520B of stored image data 530B is displayed in image display window 520 on display screen 56.

Since there is some information that is stored in memory unit 64 that is outside image display window 520B, the user can begin panning the image, using 4-way controller 506, and immediately observe the panning operation, without the need to wait for new image data to be downloaded to photo phone 12. This provides "real-time" panning, as depicted in FIG. 10C. In this figure, image display window 520C has moved up to display the "upper area" data stored earlier in memory unit 64 when the user first entered the zoom mode. As the user pans the image, photo phone 12 communicates with the service provider to obtain from the service provider higher resolution image data 540 in the direction that the user is panning, in order to augment the data stored in memory unit 64 to continue to provide "real time" panning response.

The invention has been described with reference to certain preferred embodiments thereof. It will be understood, however, that modifications and variations are possible within the scope of the appended claims.

PARTS LIST

10 Camera/Battery Module
10A battery module
12 Camera System/photo phone
13 Camera Electronics
15 Rechargeable Battery for c/b module 10
15A Rechargeable Battery for battery module 10A
22 Lens
23 Power Contacts
35 Signal Contacts
26 Electrical Contacts
26A Electrical Contacts
27 Mounting Clips
48 Mobile Telephone
51 Lens Cover
53 Switch
54 Antenna
56 Display Screen
58 User controls; user interface
62 Control Processing Unit
64 Memory Unit
66 Cellular Transceiver
70 Audio Codec
72 Microphone
74 Speaker
76 Power Supply
78 Camera Interface
86 Connector
124 Image Sensor
126 Programmable Logic Device
128 memory device
130 camera processor
132 UART
134 camera power supply
200 system
210 customer computer
212 electronic camera
214 storage drive
216 third party computer
218 storage drive device
220 communication service provider
222 communication service provider (CSP)
240 cellular provider network
242 web server
244 cellular network interface
246 cellular transmitters
248 wire telephone system
250 communication network
268 transportation vehicle
270 fulfillment provider
272 fulfillment web server
274 commerce manager
275 fulfillment manager
276 fulfillment computer system
278 digital printer
280 photo service provider
282 web server
284 account manager
286 computer system
288 database
290 photofinisher
291 computer
292 photographic film
293 server
294 film processor
296 film scanner
297 printer
298 memory device
502 enter key
504 end key
506 4-way controller
510 control window
512 zoom icon
514 share icon
516 print icon
518 next/last icon
520 image display window
520A image data
520B smaller central portion
530A image display window
530B image data
540 larger central image data area higher resolution image data

What is claimed is:

1. A system for accessing and viewing images from a collection of user stored images, comprising:
   a database for storing a plurality of user accounts, each user account being associated with a collection of user stored images and each user stored image having geographic location metadata;
   a portable imaging device comprising:
      a receiver adapted to receive images transmitted from the database;
      a memory for storing at least one of the received images;
      a display for displaying the images stored in the memory; and
   means for determining a geographic location of the portable imaging device;
   wherein the images transmitted from said database to the portable imaging device are selected in response to the determined geographical location of the portable imaging device and the geographic location metadata associated with the user stored images in the user account associated with said portable imaging device.

2. The system of claim 1, wherein the image first transmitted has associated geographic information substantially similar to the geographic location of the portable imaging device.

3. The system of claim 1, wherein the portable imaging device further comprises a microphone and a speaker adapted for audio communication, and the user controls enables selection of a telephone mode of operation and an image display mode of operation.

4. The system of claim 1, wherein the portable imaging device further comprises an image sensor for capturing a digital image, and the user controls enables selection of an image display mode of operation and an image capture mode of operation.

5. The system of claim 4, further comprising a camera/battery module and wherein the image sensor is provided as part of the camera/battery module.

6. The system of claim 1, wherein the means for determining a geographic location of the portable imaging device comprises a cellular provider network including a plurality of cellular transmitters adapted to communicate with the portable imaging device, and the geographic location of the portable imaging device is determined by the location of one of the plurality of cellular transmitters communicating with the portable imaging device.

7. The system of claim 1, wherein the user controls enables a zoom operation to enlarge at least a portion of the displayed image.

8. The system of claim 1, wherein the user controls enables ordering of a hard copy print of the displayed image.

9. The system of claim 8, wherein the display displays at least two user designees who can be selected for receipt of the hard copy print, wherein the user designees are displayed in an order dependent on the location of the portable imaging device.

10. The system of claim 1, wherein the user controls enables the transmission of the displayed image to a user designee.

11. The system of claim 10, wherein the display displays at least two user designees who can be selected for receipt of the transmission of the displayed image, wherein the user designees are displayed in an order dependent on the location of the portable imaging device.

12. A method for accessing and viewing images from a collection of user stored images, comprising:
  storing a plurality of user accounts in a database and associating each user account with a collection of user stored images, each user stored image having geographic location metadata;
  providing the portable imaging device adapted to receive images transmitted from the remote location;
  determining a geographic location of the portable imaging device; and
  selecting images for transmission from said database to the portable imaging device in response to the determined geographical location of the portable imaging device and said geographic location metadata associated with the user stored images in the user account associated with said portable imaging device.

13. The method of claim 12, wherein the image first transmitted has associated geographic information substantially similar to the geographic location of the portable imaging device.

14. The method of claim 12, wherein the portable imaging device further comprises a microphone and a speaker adapted for audio communication.

15. The method of claim 12, wherein the portable imaging device further comprises an image sensor for capturing a digital image.

16. The method of claim 12, wherein the step of determining a geographic location of the portable imaging device is accomplished by providing a cellular provider network including a plurality of cellular transmitters adapted to communicate with the portable imaging device, and the geographic location of the portable imaging device is determined by the location of one of the plurality of cellular transmitters communicating with the portable imaging device.

17. The method of claim 12, further comprising the step enlarging at least a portion of the displayed image.

18. The method of claim 12, further comprising the step of ordering a hard copy print of the displayed image.

19. The method of claim 18, further comprising the step of displaying at least two user designees who can be selected for receipt of the hard copy print, wherein the user designees are displayed in an order dependent on the location of the portable imaging device.

20. The method of claim 12, further comprising the step of transmitting the displayed image to a user designee.

21. The method of claim 20, further comprising the step of displaying at least two user designees who can be selected for receipt of the transmission of the displayed image, wherein the user designees are displayed in an order dependent on the location of the portable imaging device.

* * * * *